Patented Feb. 24, 1925.

1,527,523

UNITED STATES PATENT OFFICE.

FERDINAND W. NITARDY, OF BROOKLYN, NEW YORK, AND LLOYD K. RIGGS, OF NEW BRUNSWICK, NEW JERSEY, ASSIGNORS TO E. R. SQUIBB & SONS, OF NEW YORK, N. Y., A CORPORATION OF NEW YORK.

CLEANSING AND POLISHING MATERIAL.

No Drawing.   Application filed June 7, 1923. Serial No. 643,983.

*To all whom it may concern:*

Be it known that we, FERDINAND W. NITARDY, a citizen of the United States, residing at Brooklyn, in the county of Kings, State of New York, and LLOYD K. RIGGS, a citizen of the United States, residing at New Brunswick, in the county of Middlesex, State of New Jersey, have invented certain new and useful Improvements in Cleansing and Polishing Material; and we do hereby declare the following to be a full, clear, and exact description of the invention, such as will enable others skilled in the art to which it appertains to make and use the same.

This invention relates to a cleansing and polishing agent suitable for a variety of uses in which scrubbing action without abrasion is desirable. The product is particularly desirable as a dentifrice either with or without admixed materials, but it may be employed with like advantages for other and analogous purposes.

Polishing agents heretofore used have have consisted principally of abrasives and such materials have a tendency to scratch and eventually to destroy the surfaces to which they are applied, particularly if these surfaces are not extremely hard. In dentifrices, many kinds of abrasives have been used but even the softest known materials of this class will in time injure the enamel of the teeth. Consequently many dentists discourage the too frequent use of polishing agents containing abrasives.

It is the object of the present invention to provide a polishing agent which is not abrasive and will not scratch relatively soft surfaces but which exercises a beneficial scrubbing action and is capable of removing foreign matter from such surfaces.

A further object of the invention is the provision of a dentifrice material which is free from injurious impurities and which may be used with impunity for scrubbing the teeth without danger of injuring the enamel or exposed dentine thereof.

Other objects and advantages of the invention will be apparent from the following description in which the preferred method of preparing the material is described. Material prepared by other methods may be used.

In an application of F. W. Nitardy, Serial No. 620,508, the advantages of structural cellulose as a polishing agent are described. We have now discovered that a particular form of cellulose is best adapted for that purpose. This cellulose is a structural material; that is to say, its cell structure is not destroyed by the treatment to which it is subjected. It consists of so-called stone cells or sclerenchyma tissue, and is found in plant growths such as non-fibrous nut shells. The shells of English walnuts, hickory nuts, cocoanuts, and the shells of peach and olive pits are examples of the sources of this tissue. The cells are characteristically short, non-fibrous, and harder than the more common celluloses. They are microscopic in size, and even when the material is finely divided they retain their natural form. The hardness does not, however, approach that of abrasives, and the action of the material when applied to a surface is that of scrubbing rather than abrasion.

In nature sclerenchyma tissue is more or less colored and carries with it other materials which cause discoloration when the tissue is mixed with alkalies. Thus a mixture with magnesium hydroxide will rapidly become black or darkly colored. In its natural state the tissue is, therefore, unsuitable for use as a dentifrice. It is necessary to remove the foreign material, and the method hereinafter described accomplishes the removal to the extent that a mixture of the tissue with alkalies will not discolor. This method may likewise be used in the purification of other cellulose materials.

The product is a white or nearly white material in a finely divided state but with the cells intact or substantially so. It is tasteless and odorless and may be used without admixture as a dentifrice. Preferably it is mixed with other materials such as flavoring, excipients, antiseptics, acid-neutralizing or other modifying agents such as are used in dentifrices. Magnesium hydroxide, for example, may be used, it being particularly advantageous. The exact proportions of the mixture are not of importance and will vary, depending upon the particular characteristics to be imparted to the dentifrice. If more or less abrasive action is desired such substances as chalk, calcium phosphate, etc., may be added, and likewise the character and amount of flavoring and antiseptic materials will vary. The dentifrice, whether including abrasives or only the tissue, may be used as a powder or mixed with liquids, such as glycerine, to form a paste. These and other modifications are usual in the manufacture of dentifrices and are within the present invention which depends upon the purified sclerenchyma tissue and its use as a scrubbing agent.

In carrying out the invention the raw tissue is first dried and pulverized to a convenient degree of fineness which is not of special importance. The material should generally be in a powdered state. It is placed in a receptacle which is preferably provided with stirring means and enough alkali solution to cover the material is added. Sodium or potassium hydroxide are suitable alkalies but other bases may be used. The strength of the solution should preferably be between 4 and 14 per cent, but in any event the presence of alkali of sufficient strength to effect mercerization should be avoided. The mass is boiled with stirring for from one to five hours, depending upon the fineness of the powder, the concentration of the alkali, the efficiency of stirring and the source of the tissue. Because of the varying factors the completion of the treatment must be determined by test.

Thus when this step of the purification is thought to be complete, a sample is removed and diluted with three times is volume of distilled water. The sample is then filtered and the filtrate is discarded. The residue is placed in a test tube or beaker and covered with a five per cent solution or sodium hydroxide and boiled for ten minutes. Three volumes of distilled water are then added and the mixture is again filtered. The filtrate is acidified with hydrochloric acid to throw out a flocculent precipitate. If this precipitate is black or dark brown the treatment is not complete and boiling must be continued. If the precipitate is light brown, flesh colored or nearly white, the alkali extraction is complete. The alkali-extracting method may be varied, but it is essential to treat the tissue with an alkali or alkaline substance until the desired change and extraction has been accomplished.

When, after the test described, the extraction is found to be complete, the entire mass is diluted with about three times its volume of distilled water and the solid matter is permitted to settle. The dark alkaline liquor is siphoned off and the precipitate is thoroughly washed with distilled water after which it is separated from the wash water by filtration. The washing method may be varied, the essential point being to remove substantially the remaining alkali together with the extracted material.

The washed residue is then mixed in a suitable vessel to the consistency of a thick paste with a solution of an alkali chlorate or hypochlorite. The chlorates or hypochlorites of sodium, potassium, calcium or other base or mixtures thereof are suitable. Hydrochloric or other suitable acid is added in quantity sufficient to acidify the solution and the mass is agitated until the solid particles become bright orange in color. Some plant tissues do not show this distinguishing characteristic and in such cases the reaction is continued for eight to twelve hours when it may be assumed to be complete. The mass is again diluted with three volumes of distilled water and thoroughly washed by decantation after which the solid material is separated by filtration.

The chlorination as above described may be modified in various ways. For example, chlorine gas may be passed through an acidified paste of tissue which has been extracted previously with alkali. This modification requires a longer time and for this reason the treatment with chlorates or hypochlorites and hydrochloric acid is preferred. Peroxides may be used as oxidizing agents and other oxidation methods than that described may be employed, but yield less satisfactory results.

After chlorination the press cake is placed in a vessel provided with stirring means and is again covered with an alkali solution which in this case should be considerably weaker than that first used. A strength of 2 to 10 per cent is suitable. Sodium or potassium hydroxide or other alkalies may be used. The mixture is boiled for one and one-half to two hours and at the end of that time it is diluted with several volumes of distilled water. The residue is washed and is finally collected by filtration. The cake is dried and if not sufficiently fine may be pulverized to further degree. It is a powder consisting of the tissue or cells and is substantially free from impurities which cause discloration in the presence of alkalies or alkaline substances.

Sclerenchyma tissue prepared as described from the nut shells is white and particularly suitable for use in dentifrices. Tissue from other sources is also white or nearly white and may be used for the same purpose. Tissue which retains some color after extraction may be utilized as a scrubbing agent where color is not so important as in a dentifrice.

From the foregoing it will be observed that we have produced a new material having desirable properties and suitable for application to uses to which the raw material is not adapted. We have also provided a dentifrice which is superior to materials heretofore used for that purpose because of the softness of the cells. The product nevertheless ensures effective scrubbing and consequently cleansing of the teeth.

Various changes may be made as indicated in the product and the method of preparing it without departing from the invention or sacrificing any of the advantages thereof.

We claim:—

1. As an article of manufacture, sclerenchyma tissue free from impurities which cause discoloration in the presence of alkaline substances.

2. A cleansing or polishing agent consisting of purified sclerenchyma tissue.

3. A cleansing or polishing agent consisting of sclerenchyma tissue free from impurities which cause discoloration in the presence of alkalies.

4. A cleansing or polishing agent consisting of sclerenchyma tissue rendered white or nearly white by a process of purification.

5. A cleansing or polishing agent including sclerenchyma tissue and an abrasive mixed therewith.

6. A cleansing or polishing agent including as its base purified sclerenchyma tissue.

7. A cleansing or polishing agent including short non-fibrous vegetable cells free from impurities which cause discoloration in the presence of alkaline substances.

8. A dentifrice including purified sclerenchyma tissue.

9. A dentifrice including purified sclerenchyma tissue with flavoring ingredients.

10. A dentifrice including purified sclerenchyma tissue with flavoring and antiseptic ingredients.

11. A dentifrice including purified sclerenchyma tissue with antacid ingredients.

12. A dentifrice including purified sclerenchyma tissue with magnesium hydroxide.

In testimony whereof we affix our signatures.

FERDINAND W. NITARDY.
LLOYD K. RIGGS.